(12) United States Patent
Rouet et al.

(10) Patent No.: US 7,450,749 B2
(45) Date of Patent: Nov. 11, 2008

(54) IMAGE PROCESSING METHOD FOR INTERACTING WITH A 3-D SURFACE REPRESENTED IN A 3-D IMAGE

(75) Inventors: Jean-Michel Rouet, Paris (FR); Maxim Fradkin, Paris (FR); Sherif Makram-Ebeid, Dampierre (FR)

(73) Assignee: Koninklijke Electronics N.V., Eindhoven (NL)

( * ) Notice: Subject to any disclaimer, the term of this patent is extended or adjusted under 35 U.S.C. 154(b) by 1059 days.

(21) Appl. No.: 10/483,018

(22) PCT Filed: Jul. 5, 2002

(86) PCT No.: PCT/IB02/02818

§ 371 (c)(1),
(2), (4) Date: Jan. 6, 2004

(87) PCT Pub. No.: WO03/005298

PCT Pub. Date: Jan. 16, 2003

(65) Prior Publication Data

US 2004/0171922 A1 Sep. 2, 2004

(30) Foreign Application Priority Data

Jul. 6, 2001 (EP) ................................. 01401821

(51) Int. Cl.
*G06K 9/00* (2006.01)
(52) U.S. Cl. ........................ 382/154; 382/128; 382/131

(58) Field of Classification Search ................. 382/154, 382/128–132
See application file for complete search history.

(56) References Cited

U.S. PATENT DOCUMENTS

| 5,891,030 A | 4/1999 | Johnson et al. |
| 6,151,404 A * | 11/2000 | Pieper .................. 382/128 |
| 6,175,655 B1 * | 1/2001 | George et al. ........... 382/257 |

OTHER PUBLICATIONS

Delingette, H.; Simplex Meshes: aGeneral Representation for 3D Shape Reconstruction; Int. Conf on Computer Vision & Pattern Recognition; Jun. 1994; 4 pages.
Glassner, A.S., ed.; Digital Cartography for Computer Graphics, in Graphics GEMS, Academic Press, (Xerox Palo Alto Research Center, pp. 307-317.

* cited by examiner

*Primary Examiner*—Matthew C. Bella
*Assistant Examiner*—Wesley Tucker

(57) ABSTRACT

The invention relates to an image processing method for displaying a processed image of a three dimensional (3-D) object using a two-dimensional display means and for interacting with the surface of the displayed 3-D object comprising the construction and display of at least two coupled views of the surface of the 3-D object, including a global 3-D view and a connected local 2-D view of the surface of said object on which local interactions are made. This method further comprises interactive navigation on the object surface in one of the two views and processing data in said view with automatic updating of corresponding data in the other coupled view. Application: Medical Imaging.

16 Claims, 3 Drawing Sheets

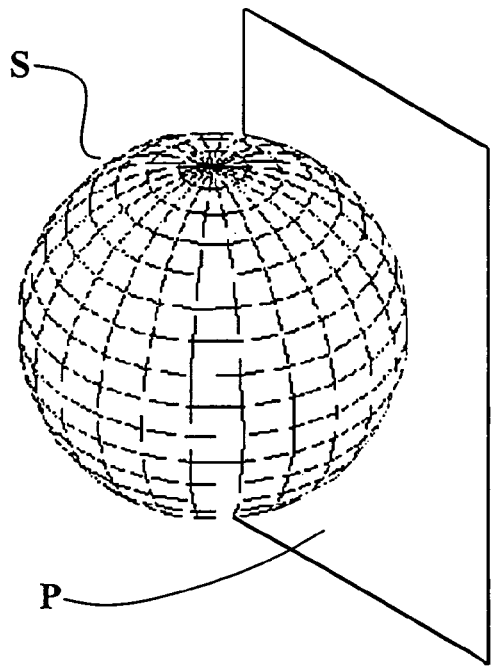
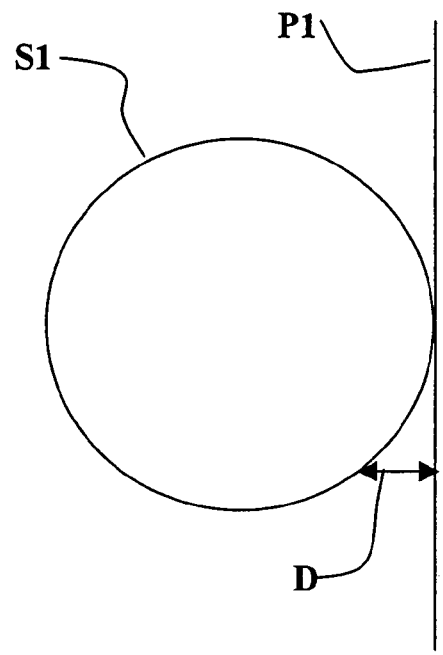
FIG.5A  FIG.5B
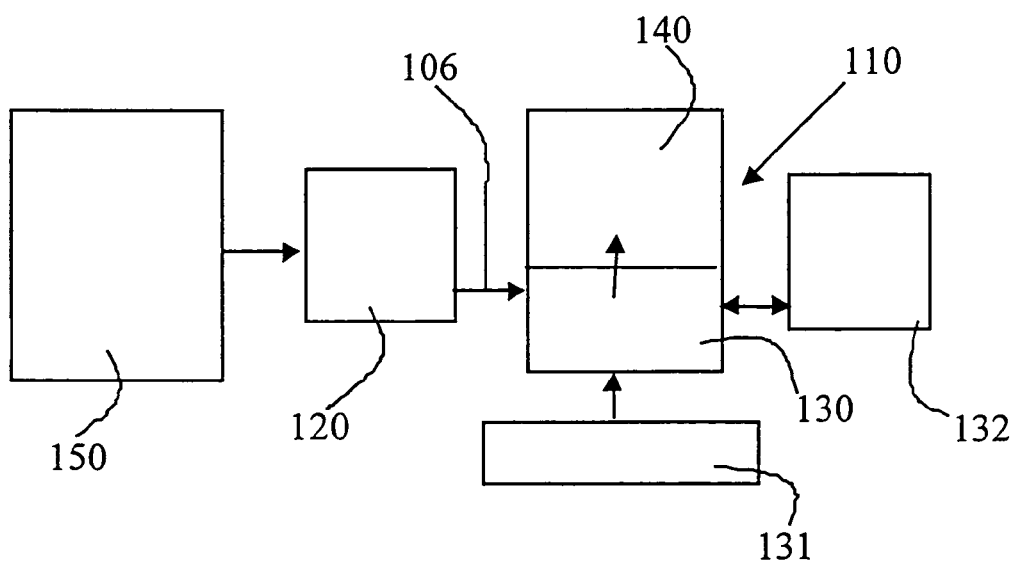
FIG.6

IMAGE PROCESSING METHOD FOR INTERACTING WITH A 3-D SURFACE REPRESENTED IN A 3-D IMAGE

The invention relates to an image processing method for displaying a processed image of a three dimensional (3-D) object using a two-dimensional display means and for interacting with the surface of the displayed 3-D object. The invention further relates to medical imaging apparatus or systems and to program products for processing medical three dimensional images produced by those apparatus or systems, for interacting with the surface of 3-D objects that are body organs.

The invention finds a particular application in the field of medical imaging methods and program products, and in medical imaging apparatus or systems.

A system for two-dimensional and three-dimensional imaging of tubular structures in the human body is already known by the U.S. Pat. No. 5,891,030 (Johnson et alii). This system is used for imaging for instance the digestive tract of a living person, with a medical imaging device such as a computed tomography (CT) scanner and a computer workstation. The CT scanner is used to generate cross-sectional axial images of a human colon which are then transferred to the computer workstation. A colon midline is defined which follows the colon lumen. The computer workstation supports colon midline definition by generating and displaying reformatted cross-sectional images, volume rendered scouts and interluminal views. Semi-automatic midline defining tools are also included. After the midline is defined, a montage of images is displayed for diagnosing purposes. The images include axial sections, transluminal cross-sections, and interluminal volume rendered images.

So, the volumetric image data is used for generation of the 2D reformatted views and 3D rendering, as well as for the navigation through the data. The patent only focuses on cylindrical or tubular surfaces. The reformatted 2D and rendered images are generated in advance according to the defined midline and then used for the navigation. The navigation is restricted to the area around the pre-defined midline path. Direct 3D interaction with the model is difficult because the field of view is limited and thus some parts of the surface may be hidden. There may be difficulties for the user to indicate and directly draw lines, contours, regions on the 3D surface, and generally interact with the 3-D image data.

The present invention relates to an image processing method for representing a 3-D object using a 2-D display means, and for navigating on and interacting with the surface of the displayed 3-D object. More particularly, the invention relates to an image processing method for representing a 3-D object that is a 3-D body organ not limited to tubular shapes, that instead may have numerous rotondities and circumvolutions, using a 2-D display means, and for navigating on and interacting with the surface of said displayed 3-D body organ.

Three-dimensional images representing 3-D objects are usually displayed on a 2-D screen associated to computing means and to a 2-D interface device such as a mouse, connected to the computing means, for acting on said 3-D image as viewed on the screen. A problem that arises when acting on 3-D images, represented on a 2-D screen, using a 2-D mouse, is that it is difficult for an operator to interactively manipulate the 3-D data while circulating or navigating in the 3-D environment. For example, it is difficult to select a region, to draw a contour, etc, while moving or rotating the 3-D object with the mouse, or changing the view point. Even when the 3-D object represented in the 3-D image is segmented using a Mesh Model, it is to be noticed that the Mesh Model is difficult to manipulate. A supplementary problem is that, in medical images, the 3-D object, which represents an organ, may show circumvolutions that make difficult the visualization of its surface and the navigation at said surface. Notably, circumvolutions render the processing of the 3-D data and the 2-D representation of the 3-D surface very difficult.

It is an object of the present invention to propose such a method enabling an easy navigation on the surface of the 3-D object represented in the 3-D image. According to the invention, this method comprises the construction and display of at least two coupled views of the surface of the 3-D object, including a global 3-D view and a connected local 2-D view of the surface of said object on which local interactions are made.

The proposed image processing method includes an image processing method for displaying a processed image of a three dimensional (3-D) object using a two-dimensional display means and for interacting with the surface of the displayed 3-D object comprising steps of construction and display of at least two coupled views of the surface of the 3-D object, including a global 3-D view and a connected local 2-D view of the surface of said object on which local interactions are made.

An advantage of this method is that the model is extracted and verified beforehand to be conformal with the original image data. In the medical field, relevant medical information can be mapped on the model surface. This medical information may represent image texture, color coding, or any other visual means (e.g., perfusion, movement, strain).

It is an other object of the invention to provide such a method comprising the interactive navigation on the object surface in one of the two views for processing data in said view with automatic updating of corresponding data in the other coupled view.

It is also an object of the invention to propose an imaging system having display means for displaying images, interface means for acting upon image data and having processing means to carry out this method. The coupled global 3-D view and a local 2-D view of the surface of a 3-D object are displayed using said imaging system. An operator can chose a starting navigation point, denoted by focus point, in the 3-D view, for example by positioning a cursor on the 3-D surface using a mouse click button. A region around the focus point is automatically projected into the 2-D view. In order to interactively navigate in the 3-D environment, the user only needs to navigate in the 2-D view and process data in the 2-D view, which is easier than in the 3-D view. Using the coupling between the 2-D and the 3-D views, the data processing is automatically and simultaneously updated in the 3-D view. Also, as both views are updated simultaneously, the focus point may be constantly set in the center of both views. So, the operator can use the 2-D view as a tool further called 'Virtual Mouse Pad'. The operator navigates in the 2-D view by sliding on said Virtual Mouse Pad, which results in that the operator can in fact continuously slide on the 3-D surface. The operator can again reposition the focus point in the 3-D view for completing a given task in the 2-D view.

The invention also relates to an X-ray medical examination apparatus having image processing means and to a program product or a program package for carrying out the method.

DRAWINGS

The invention is described hereafter in detail in reference to the following diagrammatic drawings, wherein:

FIG. 5A and FIG. 5B illustrate a technique of projection for projecting a region of the 3-D object and forming the local 2-D view;

FIG. 6 illustrates an apparatus having a system for carrying out the image processing method.

DESCRIPTION

Figure 1A:
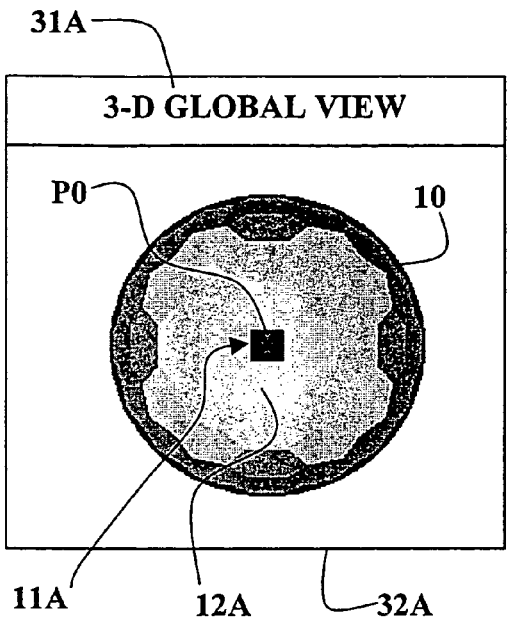
FIG. 1A represents, on a 2-D screen, a global 3-D view of a 3-D object in a first window

The invention relates to an image processing method to be applied to a three dimensional image for example represented in gray levels. This image may be provided by a medical examination apparatus and may represent the three dimensional surface of an organ called Object, which is not limited to tubular organs. In order to provide the user with a better view of said Object, for instance with respect to the background, this Object may be segmented.

The 3-D image representing a 3-D Object is displayed using an imaging system including display means, such as a 2-D screen, associated to computing means and to a 2-D interface device, such as a mouse, for navigating and acting on said image.

This image processing method comprises the construction in view of further simultaneous display of at least two coupled views of the 3-D Object surface, including a global 3-D view and a local 2-D view of the surface of said Object, on which local interactions are made and are automatically updated on the 3-D view.

The present method comprises means for static and dynamic representations of said two coupled views. An operator can chose a starting navigation point, denoted by focus point, in the 3-D view, for example by positioning a cursor on the 3-D surface using a user interface, such as a mouse click button. A region around the focus point is defined and is automatically projected into the 2-D view. According to the present method, the amplitude of said region may be automatically delimited in order to avoid that the distortion of elements exceeds a predetermined threshold. Different colors may be attributed to parts of said region in function of their distortion. Generally the distortion at a given point of the region is an inverse function of the distance separating this point from the focus point. Also according to the present method, the views further have orientation means forming corresponding landmarks. Orientation axes superimposed onto the 3-D view form a first landmark and corresponding orientation axes superimposed on the 2-D view form a corresponding second landmark. Preferably, the different axes are colored in different colors and the corresponding axes are colored in the same color in order to permit the operator to easily recognize them in each of the two views.

The present method also comprises means for a dynamic representation of said coupled views. This method comprises the interactive navigation on the Object surface in one of the two views for processing data in said view with automatic updating of corresponding data in the coupled view. In order to interactively navigate in the 3-D environment, the user only needs to navigate in the 2-D view and process data in the 2-D view, which is much easier than in the 3-D view. Due to the coupling between the 2-D and the 3-D views, the data processing is automatically and simultaneously updated in the 3-D view. Also, as both views are updated simultaneously, the focus point and the landmark may be constantly set in the center of both views. So, the operator can use the 2-D view as what is called hereafter a 'Virtual Mouse Pad'. By navigating in the 2-D view, the operator can continuously slide on the 3-D surface. The operator can reposition the focus point and the landmark in the 3-D view for completing a given task in the 2-D view. Instead, by pointing on the 2-D view, the operator can update the 3-D view.

The present image processing method comprises steps of:

1) Acquisition of the 3-D Image of the Object of Interest

The way the three dimensional image is acquired is not part of the invention. The method could be applied to three-dimensional images of organs that can be acquired by ultrasound systems or X-ray apparatus or by other systems known of those skilled in the art. A three dimensional object is illustrated in FIG. 1A. In this example, the 3-D object is segmented according to a segmentation technique disclosed by H. Delingette in the publication entitled "Simplex Meshes: a General Representation for 3-D shape Reconstruction" in the "Processing of the International Conference on Computer Vision and Pattern Recognition (CVPR'94), 20-24 Jun. 1994, Seattle, USA". In this paper, a physically based approach for recovering three-dimensional objects is presented. This approach is based on the geometry of "Simplex Meshes". Elastic behavior of the meshes is modeled by local stabilizing functions controlling the mean curvature through the simplex angle extracted at each vertex (node of the mesh). Those functions are viewpoint-invariant, intrinsic and scale-sensitive. So, Simplex Meshes are very adaptive structures. A refinement process for increasing the mesh resolution at highly curved or inaccurate parts comprises connecting Simplex Meshes in order to recover complex Models from parts having simpler shapes. A Simplex Mesh has constant vertex connectivity, each vertex being connected to three neighboring vertices. It can represent all types of orientable surfaces. Four independent transformations are defined for achieving the whole range of possible Mesh transformations. They consist in inserting or in deleting edges in a face. The deformation implies internal and external forces. Internal forces determine the response of a physically based model to external constraints. The internal forces are expressed so that they be intrinsic viewpoint invariant and scale dependant. Similar types of constraints hold for contours. Hence, the cited publication provides a simple Model for representing a given 3-D Object. It defines the forces to be applied in order to reshape and adjust the Model onto the 3-D Object of interest. The "Simplex Mesh technique" is an iterative method providing a robustly segmented image.

2) Static Representation of Two Coupled Views

Figure 1B:
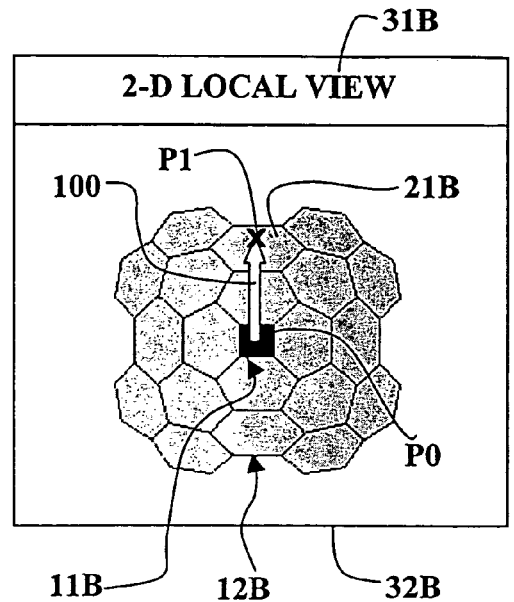
FIG. 1B represents a 2-D projected local view in a second window, which is processed according to the image processing method.

Referring to FIG. 1A and FIG. 1B, a set of two coupled view windows is constructed and displayed on a screen. As illustrated by FIG. 1A, this set of coupled view windows comprises a first view window 32A for displaying the 3-D global view of the Object of interest. This 3-D global view is favorably segmented, thus showing the 3-D Object with faces and edges of the Simplex Mesh Model. In FIG. 1A, as a matter of example, the segmented Object is a spherical or round Object 10. Preferably, indications that the view represents a 3-D global Object are provided in a sub-window 31A of the first window 32A. As illustrated by FIG. 1B, this set of coupled views further comprises a second window 32B for displaying the 2-D projection view of a local area of the Object of interest. The second window 32B has indications, located in the sub-window 31B, that it represents a local 2-D view.

The user chooses a starting navigation point P0 in the 3-D global view 32A, for example by positioning the mouse cursor on the Mesh Model surface 10 and by clicking the mouse button. Further on the point clicked by the user is called focus point. In the present example, the focus point P0 is located in a face 11A of the Mesh Model. An unfolded region 12A, around the focus point P0, is projected into the 2-D view in the second window 32B, for forming a projected surface 12B, using a flattening technique known by those skilled in the art. The dimension of the area of said projected surface 12B is limited in order to avoid projection distortions.

In order to ease the visualization of the focus point P0 and of the projected region 12A, 12B, different colors may be attributed to zones of interest. For example, the face 11A, 11B of the Mesh Model in the coupled first and second windows, where the focus point P0 is positioned, is attributed a first color, shown by a first gray level in FIG. 1A and FIG. 1B. Ring zones around the focus point may be attributed different colors associated to the distortion values found in said zones. Generally the distortion increases with the distance to the focus point. The selected projected region 12B is delimited in function of a flattening distortion.

The 2-D local view represented in the second window 32B is coupled to the 3-D global view represented in the first window 32A. A direct one-to-one mapping between the 2-D and the 3-D views is implicitly known through the model cells, thus there is a direct correspondence between the two views. Any action performed with the interface means on the 2-D local projection view 32B is automatically updated in the 3-D global view 32A.

Figure 3A:
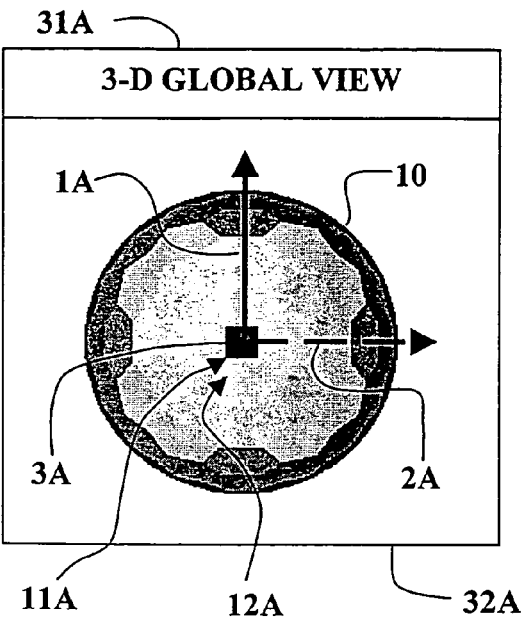
FIG. 3A and FIG. 3B represent respectively the global 3-D view and the projected local view of FIG. 1A and FIG. 1B with a landmark.
Figure 3B:
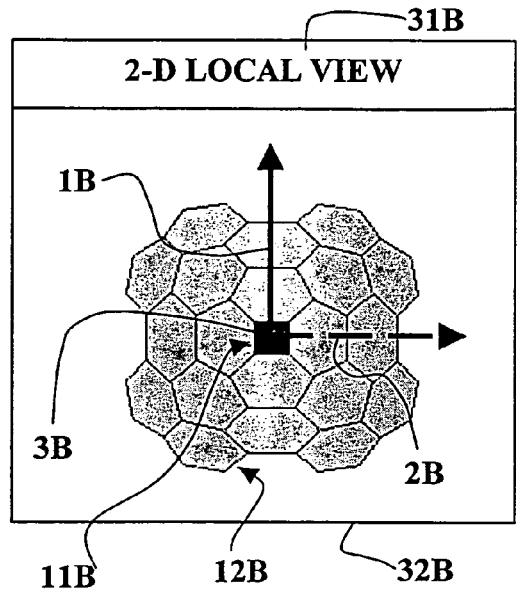

Referring to FIG. 3A and FIG. 3B, the coupled views are provided with corresponding landmarks. As illustrated by FIG. 3A, the 3-D global view comprises a first axis 1A and a second orthogonal axis 2A in the plane of the screen; and a third axis 3A orthogonal to the plane of the screen. As illustrated by FIG. 3B, the 2-D local view comprises a first corresponding axis 1B and a second orthogonal corresponding axis 2B in the plane of the screen; and a third corresponding axis 3B orthogonal to the plane of the screen. The first corresponding axes 1A, 1B may have a first color represented in the figures by a full line. The second corresponding axes 2A, 2B may have a second color represented in the figures by a doted line. The third corresponding axes 3A, 3B may have a third color represented in the figures by a cross. Thus the user can easily recognize the corresponding axes in the coupled views.

As a direct one-to-one mapping between the 2-D and the 3-D views is inherited from the flattening process, thus there is a direct correspondence between every pixel of the two views. Any action performed with the interface means on the pixels of the 2-D local projection view 32B is automatically updated on the corresponding pixel of the 3-D global view 32A. This property is obtained by coupled computations performed by computation means connected to the user interface. This property is particularly useful for mapping easily the 3-D surface of the Mesh Model with medical information. This information is introduced in the 2-D surface view. This medical information may represent image texture, color coding, or any other visual means such as perfusion, movement, strain related to the organ. This property is also particularly useful for designing on the 3-D surface. The designs are performed very easily on the 2-D surface view. The designs can be lines that are drawn to mark a specific organ part; contours for defining or enhancing an organ part.

3) Dynamic Representation for Interactive Navigating in the Coupled Views

A difficulty that was found when navigating directly on a 3-D surface, represented on a 2-D screen, using a 2-D mouse, is that it is difficult for an operator to interactively manipulate the 3-D data while circulating or navigating in the 3-D environment. For example, it is difficult to move or rotate the 3-D object with the mouse and simultaneously to select a region, to draw a contour that begins on a part in front of the object and then continues on a part situated behind the object or organ, etc. Even when the 3-D object represented in the 3-D image is segmented using a Mesh Model, it is to be noticed that the Mesh Model is difficult to manipulate. A supplementary problem is that, in medical images, the 3-D object, which represents an organ, may show circumvolutions that make difficult the visualization of its surface and the navigation at said surface. Notably, circumvolutions render the processing of the 3-D data and the 2-D representation of the 3-D surface very difficult.

In order to navigate interactively in the 3-D view 32A, the user only needs to place and click the mouse button on the 2-D view 32B. As illustrated by FIG. 1B, the user may want to navigate upwards with respect to the starting point P0. Then, the user chooses a new focus point P1 located for example in the face 21B of the 2-D local view 32B. Automatically, the focus point is displaced along the arrow 100 to be further found at the point P1.

Figure 2A:
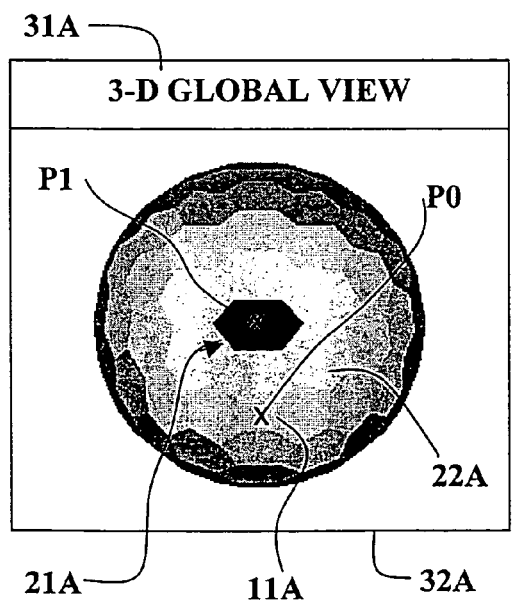
FIG. 2A and FIG. 2B represent respectively the global 3-D view and the projected local view updated after a displacement according to the arrow of FIG. 1B.
Figure 2B:
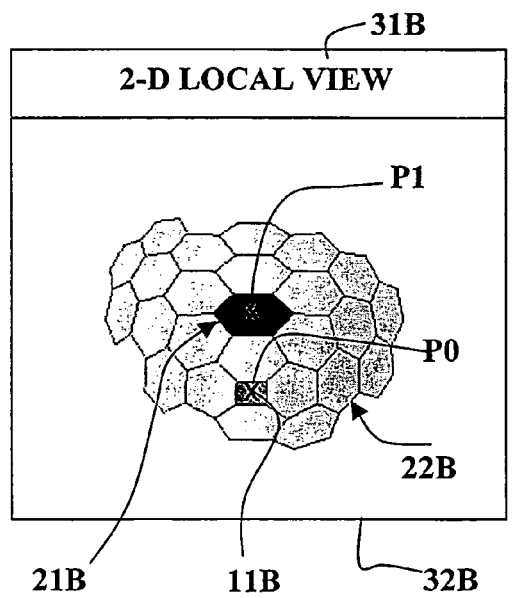

Referring to FIG. 2A and FIG. 2B, both global and local views are updated automatically and simultaneously. According to the invention, the new focus point is automatically and simultaneously set at the center of the updated windows 32A and 32B. So, the new focus point is constantly positioned at the center of the updated windows. This property allows the user, using the 2-D view as a virtual mouse-pad for continuously sliding on the 2-D view, to automatically and simultaneously slide on the 3-D view. FIG. 2A represents the new focus point P1 at the center of the global view window 32A and at the center of the local view window 32B. This new focus point is located in the face 21B. The new computed projected region is 22B in the local view 32B. The corresponding 3-D region 22A is automatically and simultaneously found in the 3-D view 32A. The above procedure can be repeated until the navigation task is completed.

Figure 4A:
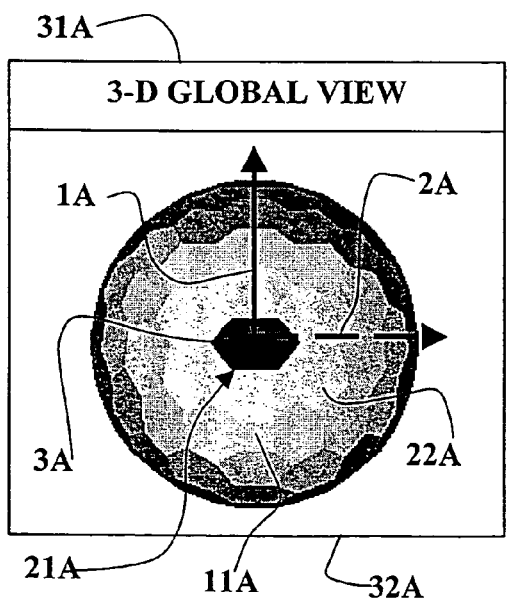
FIG. 4A and FIG. 4B represent respectively the global 3-D view and the projected local view of FIG. 2A and FIG. 2B with the landmark.
Figure 4B:
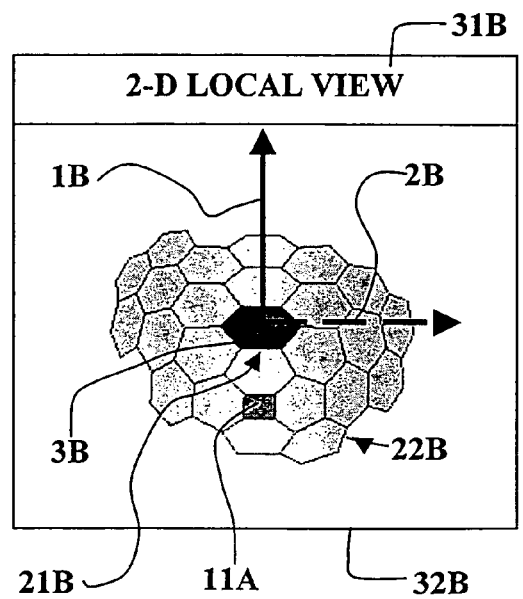

Referring to FIG. 4A and FIG. 4B, not only the focus point and the image points are updated by sliding on the one of the two coupled images, but also the landmark is updated. Thus the user can easily navigate on a complex surface without getting lost. The user can perform continuous interaction with a 3-D surface model, such as region selection, drawing curves all around the surface model, cutting model parts, delineate regions on complex surfaces, make measurements of curvilinear contours, such as geodesics region areas etc. When the texture is available and mapped on the Model, the user can perform edge detection, feature extraction and other measures on the mapped texture. For instance following the movement of a guide-wire, detecting a stent are possible operations that are easier to perform on the 2-D local view. Interaction with the model is not limited to the cited examples. The present invention is particularly interesting in the field of cardiology where it can be applied to the models of the heart ventricles, in the field of spine pathology studies where it can be applied to models of the vertebrae, in the fields of arteriology and phlebology, etc.

4) Projection Technique

Any projection technique resulting in local surface flattening as known by those skilled in the art can be used. For example, a projection technique known by those skilled in the art, which is described in reference to FIG. 5A and FIG. 5B, may be used. This technique comprises an operation of associating a plane P to a 3-D object S as represented on FIG. 5A. FIG. 5B illustrates a cross section of the 3-D object and the plane. Each point of the contour of the cross-section is projected on the plane cross-section along the arrow direction D. A cross-section of the object is designed to correspond to each column of the plane and the points of the corresponding contour of the object cross-section are projected on the plane. Thus a projection of the object contour is obtained. Various methods for performing a projection are for example described in "GRAPHICS GEMS" edited by ANDREW S. GLASSNER, ACADEMIC PRESS (Xerox Palo Alto Research Center, Palo Alto, Calif.), p. 307-317.

5) System for Carrying Out the Method

Referring to FIG. 6, a medical diagnostic imaging apparatus 150 comprises means for acquiring three-dimensional digital image data, and a digital processing system 120 for processing these data according to the processing method described above. The medical examination apparatus comprises means for providing image data to the processing system 120 which has at least one output 106 to provide image data to display and/or storage means 130, 140. The display and storage means may respectively be the screen 140 and the memory of a workstation 110. Said storage means may be alternately external storage means. This image processing system 120 may be a suitably programmed computer of the workstation 130, whose instructions are given by a program product, or a special purpose processor having circuit means such as LUTs, Memories, Filters, Logic Operators, that are arranged to perform the functions of the method steps according to the invention. The workstation 130 may also comprise a keyboard 131 and a mouse 132.

The invention claimed is:

1. Image processing method for displaying a processed image of a three dimensional (3-D) object using a two-dimensional display means and for interacting with a surface of the displayed 3-D object comprising:
constructing and displaying at least two coupled views of the surface of the 3-D object, including (i) a global 3-D view of the surface of said object and (ii) a connected local 2-D view of the surface of said object, wherein constructing and displaying of the two coupled views comprises using a flattening process to obtain a direct one-to-one mapping between the 3-D and the 2-D views, selecting a starting focus point on the surface of the said object in the global 3-D view and projecting an unfolded region around the starting focus point of the global 3-D view which is delimited as a function of a flattening distortion into the local 2-D view to form a projected surface region in the local 2-D view, wherein the projected surface region comprises a limited area dimension that avoids projection distortions, and wherein the connected local 2-D view comprises the surface view on which local interactions are performed.

2. The method of claim 1, further comprising steps of interactive navigation on the object surface in one of the two views and processing data in said view with automatic updating of corresponding data in the other coupled view.

3. The method of claim 2, further wherein selecting the starting focus point provides for a static representation of said two coupled views.

4. The method of claim 3, wherein the two coupled views further have orientation means forming corresponding landmarks.

5. The method of claim 4, wherein orientation axes are superimposed onto the 3-D view to form a first landmark and corresponding orientation axes are superimposed on the 2-D view to form a corresponding second landmark,
and wherein the different axes are colored in different colors and the corresponding axes are colored in the same color in order to recognize them in each of the two views.

6. The method of claim 3, wherein for a dynamic representation of said coupled views, the method further comprising:
performing interactive navigation on the object surface, with sub-steps of sliding the focus point to a new location within the 2-D view, which automatically updates the new focus point in the 3-D view, defining a new unfolded region around the new focus point in the 3-D view which is delimited as a function of the flattening distortion and automatically projecting said new region into the 2-D view, and sub-steps of processing data in said new region of the 2-D view, which automatically and simultaneously updates corresponding data in the coupled 3-D view.

7. The method of claim 6, wherein, as both views are updated simultaneously, the focus point and the landmark are constantly set in the center of both views.

8. The method of claim 3, wherein different colors are attributed to the different elements of the 3-D view, which include different colors for the different axes and different colors for the different regions, and corresponding colors are attributed to the corresponding elements in the 2-D view, and wherein the different colors are updated simultaneously and automatically in both views.

9. The method of claim 1, wherein the 3-D object of interest is segmented using a Mesh Model technique.

10. The method of claim 9, for processing data in 3-D medical images, representing organs, wherein medical information is mapped on the 3-D Mesh Model, wherein this information is introduced in the 2-D surface view and wherein, among medical information there are visual medical indications such as image texture, color coding, or any other visual means such as perfusion, movement, strain related to the organ.

11. The method of claim 10, further comprising:
performing designs on the 2-D surface view and automatically and simultaneously updating in the 3-D view, wherein said designs include among (i) lines that are drawn on the 2-D surface view to mark a specific organ part, (ii) contours for defining an organ part, and (iii) specific designs for enhancing an organ or an organ part.

12. The method of claim 10, wherein during a navigation step, a continuous interaction with a 3-D surface model is performed by sliding on the 2-D model, called Virtual Mouse Pad, and wherein among interaction there are region selection, curve drawing on any part of the surface model, model part cutting, region delineating on complex surfaces, measurements of curvilinear contours; and when the texture is available and mapped on the Model, among interaction there are edge detection, feature extraction and/or medical measures on the mapped texture, such as following the movement of a guide-wire and/or detecting a stent.

13. The method of claim 10, wherein the Models of organs are the models of the heart ventricles in cardiology, the models of the vertebrae of the spine, the blood vessels in arteriography and phlebology.

14. A system comprising a suitably programmed computer or a special purpose processor having circuit means, which are arranged to process image data according to the method as claimed in claim 1.

15. A medical diagnostic imaging apparatus having: Means to acquire a tri-dimensional image of an organ of a body; display means for displaying the coupled 3-D and 2-D views; interface means to act on the 2-D and 3-D views; and processing means to carry out the method as claimed in claim 1.

16. A computer-readable medium comprising a set of instructions executable by a computer for carrying out the method as claimed in claim 1.

* * * * *